United States Patent [19]
Hymes

[11] Patent Number: 5,465,652
[45] Date of Patent: Nov. 14, 1995

[54] COOKING APPARATUS AND METHOD

[76] Inventor: Richard H. Hymes, 130 Sunrise Ave., Tonka Bay, Minn. 55331

[21] Appl. No.: 197,265

[22] Filed: Feb. 16, 1994

[51] Int. Cl.[6] ........................................................ A47J 37/07
[52] U.S. Cl. .......................... 99/400; 99/401; 99/425; 99/444; 99/447; 426/523
[58] Field of Search .......................... 99/415, 410, 447, 99/478, 401, 425, 444, 400; 426/523

[56] References Cited

U.S. PATENT DOCUMENTS

| | | |
|---|---|---|
| 1,568 | 11/1863 | Morrill . |
| 2,767 | 8/1842 | Riley . |
| 29,238 | 7/1860 | Brooks et al. . |
| 79,056 | 6/1868 | Denn . |
| 86,923 | 2/1869 | Isham . |
| 743,688 | 11/1903 | Butler . |
| 1,373,788 | 4/1921 | Ball ................................ 99/425 |
| 1,389,770 | 9/1921 | May ................................ 99/425 |
| 1,451,971 | 4/1923 | Tocchio ........................... 99/425 |
| 1,642,071 | 9/1927 | Hosking . |
| 1,899,682 | 2/1933 | Goldenberg . |
| 2,099,788 | 11/1937 | Ames . |
| 2,117,749 | 5/1938 | Studer ............................. 99/446 |
| 2,200,335 | 5/1940 | Ingersoll . |
| 2,236,992 | 4/1941 | Broadley . |
| 2,774,295 | 12/1956 | Watkins .......................... 99/425 |
| 3,308,747 | 3/1967 | Spadndo ......................... 99/425 |
| 3,314,358 | 4/1967 | Burns .............................. 99/415 |
| 3,427,957 | 2/1969 | O'Reilly ......................... 99/446 |
| 3,616,748 | 11/1971 | Foreman ......................... 99/444 |
| 3,664,256 | 5/1972 | Peirce ............................. 99/425 |
| 3,683,792 | 8/1972 | Groves, Jr. et al. ............. 99/447 |
| 3,704,142 | 11/1972 | Wilson ............................ 99/446 |
| 3,908,534 | 9/1975 | Martin ............................. 99/418 |
| 3,946,651 | 3/1976 | Garcia ............................. 99/444 |
| 4,653,461 | 3/1987 | Eke ................................. 99/444 |
| 4,697,506 | 10/1987 | Ducate, Jr. ...................... 99/482 |
| 4,729,297 | 3/1988 | Iranzadi .......................... 99/401 |
| 4,793,324 | 12/1988 | Caferro ........................... 99/415 |
| 4,971,819 | 11/1990 | Miyahara ........................ 99/358 |
| 4,976,252 | 12/1990 | Cianciola ........................ 99/401 |
| 5,009,151 | 4/1991 | Hungerford .................... 99/425 |
| 5,070,777 | 12/1991 | Novak ............................. 99/482 |
| 5,105,725 | 4/1992 | Haglund .......................... 99/446 |

FOREIGN PATENT DOCUMENTS

| | | |
|---|---|---|
| 516097 | 12/1952 | Belgium . |
| 666213 | 9/1929 | France . |
| 2620600 | 9/1987 | France . |
| 60-225522 | 4/1984 | Japan . |
| 2222657 | 2/1989 | Japan . |

Primary Examiner—David Scherbel
Assistant Examiner—Reginald L. Alexander
Attorney, Agent, or Firm—Haugen and Nikolai

[57] ABSTRACT

An apparatus and method for cooking food which includes the utilization of heat conductive bar members arranged to be placed over the heat surface or source, with the bar members spaced apart at a distance of between about 1/8 of an inch and 1 1/4 of an inch. The heat-conductive bar members are supported a thermally conductive barrier such as aluminum foil.

6 Claims, 3 Drawing Sheets

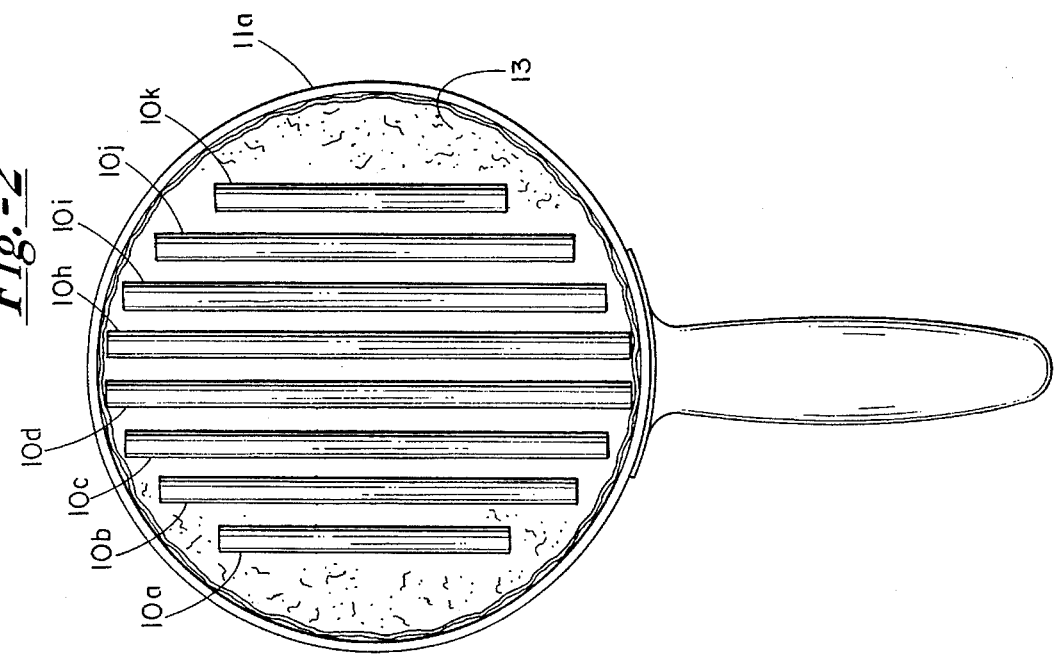
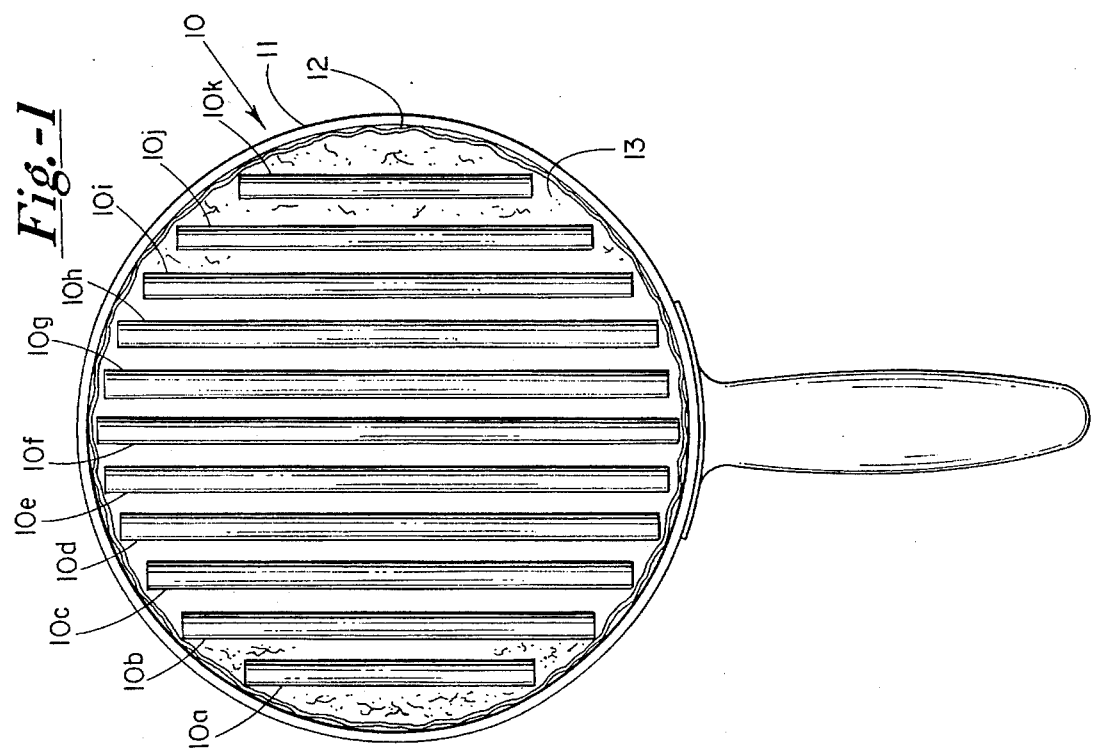

5,465,652

COOKING APPARATUS AND METHOD

BACKGROUND OF THE INVENTION

The present invention relates generally to a cooking apparatus and a method of utilizing the apparatus, and more particularly to a method for grilling articles of food for human consumption.

One of the oldest methods known for cooking food is grilling. The art of grilling, of course, has been refined over the years. Modern-day grilling generally contemplates a grill used in connection with burning natural gas or propane, or hot combustible coals such as charcoal. One conventional outdoor grilling unit is generally comprised of a plurality of support legs, a kettle for holding charcoal, a grill to be placed above the coals, and a ventilated cover. Additionally, some kettles are ventilated. A conventional gas-fired or gas-grilling unit is generally comprised of a gas-based heating element and a grill in addition to the usual support members. Gas-grilling units are provided with a number of features and are designed in various ways, and may be suitable for use either in or out of doors. Charcoal-grilling units are, as a general rule, suitable for outdoor use only.

There are distinctive advantages to grilling food, as opposed to frying or baking food. From a health standpoint, grilled food has been recognized, when prepared conscientiously, as being healthier than fried food or, in some instances, even baked food. Unlike frying, grilling of meat eliminates grease and fat which, rather than soaking into the articles of food being prepared, drips off the meat and onto the coals, heating source or side of the kettle. Grilled food has also been recognized as being healthier for consumption than food that is baked, for example, in a bowl or other container that traps fat or grease which, in turn, soaks into the food being baked.

Additionally, it is well known that grilled food has a distinctive flavor.

Certain disadvantages present themselves to those who grill food. For example, in the case of outdoor charcoal grilling, it is common to use lighter fluid. Lighter fluid is known to present environmental and safety hazards. For example, the fumes emitted by such fluid are known to present an environmental hazard. Additionally, if misused, such fluid presents significant safety hazards.

An additional disadvantage to charcoal grilling is that one must wait for the charcoal to burn down to a level where ash covers the surface so that fat or grease dripping off of the food being cooked will not ignite as a result of dripping down onto the remaining unburned charcoal. Similarly, one must wait for the charcoal to burn down to the extent that the food placed above the grill will properly cook. The charcoal-burning process takes time, and often one contemplating charcoal grilling will forego the experience because of time-related constraints. Furthermore, the charcoal-grilling process is known to be messy based upon the nature of most commercially available charcoal briquets and lighter fluid.

Natural gas/propane grilling units normally heat up faster than charcoal grills. Furthermore, barbecuing on these grills is a cleaner process than charcoal grilling based upon the fact that neither charcoal briquets nor lighter fluid is employed. These grills, however, are costly. Additionally, the flavor obtained in connection with gas barbecuing may be tainted if, for example, unburned gas fumes containing mercaptan odorants permeate the item being cooked. If a propane tank is being employed, the user of the unit may also run out of fuel while grilling and prior to completion.

Stovetop cooking has the benefit of being easy and efficient. For example, a hamburger or steak is far easier to cook in a conventional frying pan via a stove-top heating unit as opposed to a charcoal grill. This is based upon the fact that in order to obtain the necessary heat energy to cook, one must, in most instances, simply activate a controller which adjusts the temperature of the stove's heating unit. Also, the cost of electricity used in connection with electric stoves is minimal as compared with the cost of charcoal and lighter fluid or propane gas. Furthermore, while most dwellings and abodes are equipped with stove-top heating units relatively few are equipped with gas-grilling units.

The dilemma that the present invention addresses is how may one enjoy the pleasures and benefits of grilling food while simultaneously enjoying the relatively easy and efficiency of frying or baking processes.

The prior art is replete with devices for use in connection with charcoal and gas grilling, as well as devices for use in connection with stove-top cooking.

Some previously known devices show the use of certain grills in connection with stoves. For example, U.S. Pat. No. 4,976,252 to Cianciola discloses a grill device positioned over a burner on a stovetop. This device contains an angularly disposed tapered surface of multiple groove channels and associated openings to support and drain food product positioned thereon into a reservoir filled with water.

U.S. Pat. No. 3,908,534 to Martin discloses a frying pan heat transfer plate for use in a frying pan or skillet, which plate transfers heat from the frying pan to the plate for rapid frying of food while permitting fat and grease to be readily drained from the surface of the plate during the frying or cooking operation.

U.S. Pat. No. 2,117,749 relates to a composite grid grill which grill is adaptable to irregularities in the surface of the range or plate upon which it is set.

It is primary object of the present invention to provide an apparatus with a grilling surface and method which allows individuals to realize the benefits of barbecuing without the attendant detriments.

It is a further object of the present invention to provide a device which allows the benefits of grilling in conjunction with the efficiency of a conventional stove-top heating element.

It is a further object of the present invention to provide a grilling surface which is usable in connection with a variety of other heating surfaces and elements.

It is also an object of this invention to provide a grilling surface which is lightweight, easy to clean and inexpensive.

It is a further object of this invention to provide an adjustable grilling surface usable in connection with a variety of different sized pans or other conventional cooking surfaces.

FIELD OF THE INVENTION

The present invention is directed toward an apparatus and accompanying methods used in connection with cooking, and in particular an improved grilling method and device.

SUMMARY OF THE INVENTION

In accordance with the present invention, an apparatus and method for cooking is disclosed contemplating utilization of a plurality of thermally conductive bars adapted to be positioned or spaced at least ⅛ inch apart, and no more than 1¼ inches apart. Said plurality of bars are of a thickness to insure that the top cooking surface of said plurality of bars is raised at least ⅛ inch off the surface supporting the lower surface of said plurality of bars, and no more than one and ½ inch off of the surface supporting the lower surface of said plurality of bars. The ranges indicated for bar spacing and for bar height have been found to enhance the grilling operation by virtue of the optimization of time as well as optimization of removal of melted or fused fat. The products when grilled under these conditions have been found to have a preferred flavor and texture, and are typically cooked thoroughly without risking areas of overcooking and/or burning.

BRIEF DESCRIPTION OF THE DRAWINGS

FIG. 1 is a top plan view of one preferred embodiment of the grilling bars of the present invention when placed in a conventional round pan;

FIG. 2 is a top view, similar to FIG. 1, of an alternate preferred embodiment of the grilling bars and the conventional round pan, with the diameter of the pan in FIG. 2 being less than that of FIG. 1 so as to preserve the appropriate spacing of the individual grilling bars;

DETAILED DESCRIPTION OF THE PREFERRED EMBODIMENTS

Figure 3:
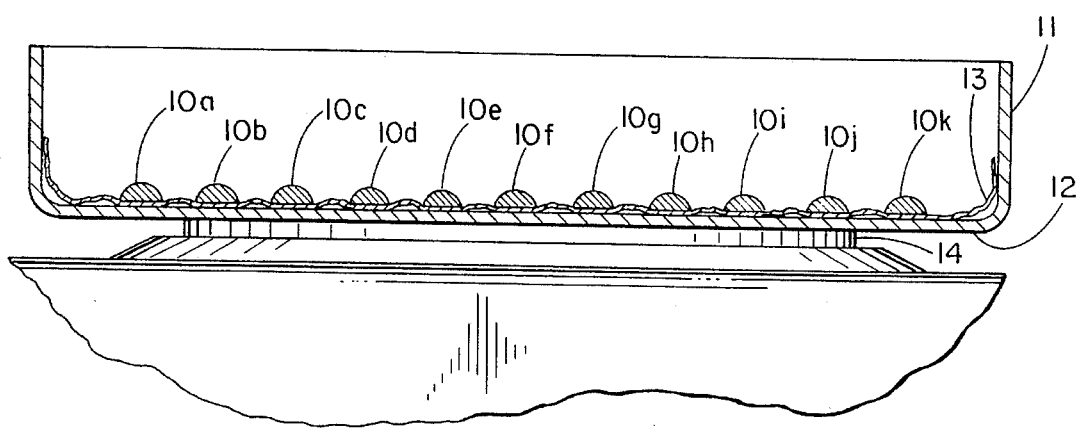
FIG. 3 is a cut-away side view taken along the line and in the direction of the arrows 3—3 of FIG. 1 and illustrating the grilling bars of the present invention placed in a conventional pan.

Referring now to the drawings, FIG. 1 depicts the individual, free-standing heat-conductive bars of the present invention 10 ready for use in a method contemplated by the present invention. It can be seen that the bar members 10-10 fit conveniently into pan 11 when in use. For convenience and ease of illustration, the bar members 10-10 have been individually designated 10a through 10k inclusive. Between bar members 10-10 and pan surface 12 is a thermally conductive barrier 13 comprised of, for example, metal-based foil. The plurality of bars 10-10 are positioned to rest on thermally conductive barrier 13. Barrier 13 creates several benefits. First of all, since the bars of the present invention are not supported by cross-bar members, the barrier 13 acts as a support for the bars. The lack of such a cross-bar member allows the plurality of bars 10-10 of the instant invention to be used in connection with a wide variety of cooking surfaces. Furthermore, the undersurface of the bars 10-10 are configured so as to be in physical contact throughout substantially all of the undersurface of the individual bars. In this fashion the transfer of heat from the base of pan 11 is enhanced, thereby maintaining a higher surface temperature for the upper surface of the grilling bars 10-10 when in use.

Use of the barrier 13, typically aluminum foil, also decreases smoking resulting from grease coming into contact with pan surface 12. The surface of barrier, while thermally-conductive, is cooler than pan surface 12. The foil barrier 13 also allows for easy cleanup after use—all the user needs to do is remove the barrier 13 and dispose of it in a conventional fashion. The weight of the plurality of bars 10 dictates that the barrier 13 will be pushed flush against the pan surface 12 resulting in excellent conductivity between pan surface 12, barrier 13 and those points of each individual bar 10a–10k in direct contact with barrier 13.

The plurality of bars may be formulated of brass, iron, steel, aluminum or any other sturdy kind of heat conductive material.

FIG. 2 depicts use of the present device in an alternative pan 11a. One advantage the present invention has over previously known grill surfaces is that the number of individual bars 10a–10k can be altered to fit the desired pan. For example, as shown in FIG. 2, individual bars 10a–10d, inclusive, and 10h–10k, inclusive, are utilized, while individual bars 10e–10g, inclusive, while seen in FIG. 1, are not being utilized due to the fact that the pan in the embodiment of FIG. 2 is somewhat smaller in diameter than the pan depicted in FIG. 1. The plurality of bars 10-10 of the present invention are selected of a variety of lengths so as to be adjustable for use in any number of cooking surfaces.

FIG. 3 is a sectional cut-away view of the apparatus of present invention illustrated in FIG. 1. The heating element 14 supports the pan 11 which contains within it separate bars 10a–10k, inclusive. The plurality of bars 10-10 are supported uprightly by the barrier 13, meaning that cross-bar supports are unnecessary, thereby allowing the user to add or subtract or otherwise interpose bars depending upon the pan configuration or amount of cooking surface desired or needed. The aluminum foil barrier 13 is manipulated in such a way that the weight of each individual bar 10a–10k rests in the pan 11 supported on substantially the entire length of its underside. This prevents shifting or tipping of the bars when the device is in use, and while the user is, for example, moving food with a spatula or similar utensil. This arrangement, as indicated hereinabove, also enhances the rate of thermal transfer between the base of pan 11 and the top food-contacting surface of the grilling bars 10-10.

Figure 4:
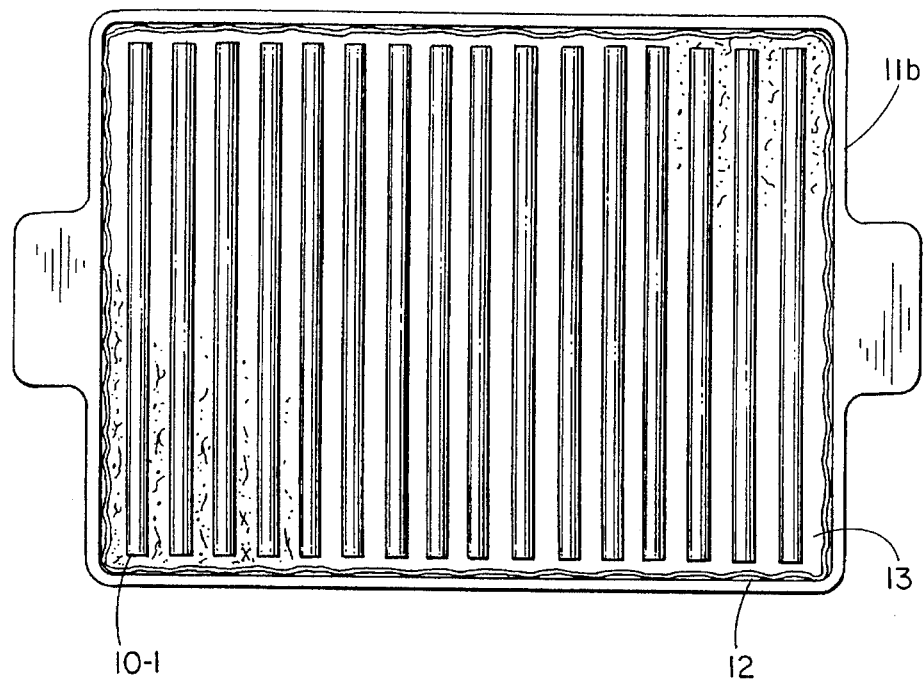
FIGS. 4 and 5 are top plan views similar to FIGS. 1 and 2 and illustrating the utilization of the grilling bars of the present invention when used in pans having alternative configurations as those shown in FIGS. 1 and 2, with the grilling bars of the present invention being used in a typical method disclosed in the present invention.
Figure 5:
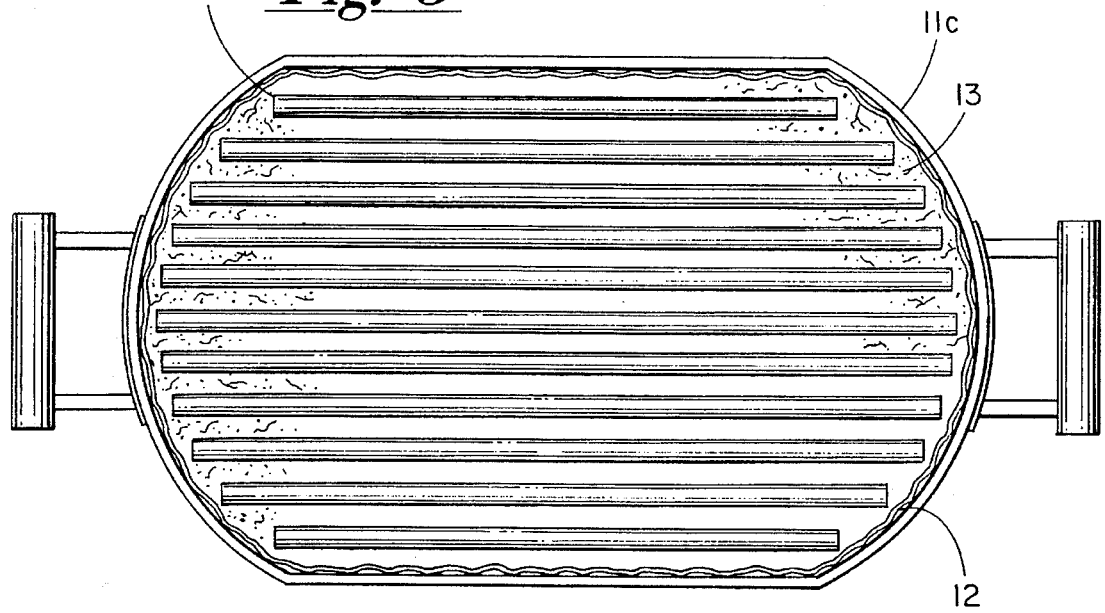

FIGS. 4 and 5 depict use of the plurality of bars 10-10 of the present invention in connection with two other differently configured pans such as 11b and 11c. The present invention contemplates use of the plurality of bars 10 of the present invention in connection with any number of pans or similar cooking devices. As indicated in FIGS. 4 and 5, the individual pans 11b and 11c have bottom surfaces illustrated as at 12b and 12c respectively.

The contemplated method of use is as follows. With attention being directed at this time to the apparatus illustrated in FIGS. 1 and 3, the method of use will be described. It will be appreciated, of course, that use of the apparatuses illustrated in FIGS. 2, 4 and 5 will be the same as that illustrated in FIGS. 1 and 3. The barrier 13 is initially placed on a pan surface such as at 12. The heat is applied and the plurality of bars 10-10 are then placed on the barrier where they are allowed to conduct heat from the heated surface 12. Upon reaching their desired temperature, food is then placed on the plurality of bars 10-10 to grill. Food cooked on the plurality of bars 10-10 will barbecue rather than fry as a result of not being in full contact with heated surface 12. Grease and fat, which otherwise would soak into the food being cooked, drops to the barrier 13 separating plurality of bars 10 from heated surface 12. Normally, grease and fat which drops onto foil barrier 13 does not ignite, thereby preserving the quality of the food article being positioned on the top or upper surface of the bars 10-10.

Ideally, the spacing between the plurality of bars 10-10 is ½ inch to ⅝ inch with acceptable parameters being a range of from ⅛ inch to 1¼ inches. If the spacing is less than ⅛ inch, it has been found that the food will tend to fry based on the large amount of contact surface area. If the spacing is greater than 1¼ inches, the heat transferred from heated surface 12 to plurality of bars 10-10 is generally inadequate to the degree that those portions of the food not in contact with or remote from the contacting surface of the plurality of bars 10-10 will not cook properly.

Utilization of the plurality of bars 10-10, foil barrier 13 and heated surface 12 in the fashion outlined above results in the user being able to undertake and enjoy all of the benefits of barbecuing without attendant disadvantages such as preparation time, cost, and environmental damage.

Once the food is cooking on the plurality of bars, the user may sometimes wish to place a cover over the pan 11. This, it has been found, results in generally more even cooking of the food. One covering an outdoor charcoal grill obtains a like result.

It has been found that half-round grilling bars fabricated from a material such as brass will preferably have a cross-sectional dimension of ⅜ inch radius. When in rectangular form, dimensions of ¼"×1 inch are suitable. Other dimensions may, of course, be useful in connection with the apparatus of the present invention.

What is claimed is:

1. In combination:
   (a) an array of metallic bars comprising a plurality of unconnected heat-conductive bar members configured to lie at the bottom of a cooking vessel, each of said bar members having an upper food supporting surface and a lower surface, said bar members each being adapted for transferring thermal energy by conduction from a heated base through a thermally conductive liquid impervious barrier to said bar members;
   (b) said thermally conductive liquid impervious barrier being located between and in contact with the lower surface of said bar members and a cooking surface;
   (c) said thermally conductive liquid impervious barrier being adapted:
      (i) to retain liquids released from food supported on said upper food supporting surface of said bar members; and
      (ii) to stabilize said bar members.

2. The combination of claim 1 wherein said thermally conductive liquid impervious barrier is comprised of aluminum foil.

3. The combination of claim 1 wherein said metallic bar members in said array number between 3 and 11.

4. The combination of claim 1 wherein said metallic bar members consist of brass.

5. A method for cooking food comprising:
   (a) placing a thermally conductive liquid impervious barrier over a cooking surface situated over a heating source;
   (b) placing an array of metallic bars comprising a plurality of unconnected heat-conductive bar members configured to lie at the bottom of a cooking vessel on said thermally conductive liquid impervious barrier, said plurality of heat-conductive bar members being spaced apart at a distance of at least ⅛" and at most 1¼", and with said bar members having a top surface which is spaced no more than 1½" above the bottom surface of each said bar member;
   (c) actuating said heating source to create an elevated temperature along said liquid impervious barrier; and
   (d) placing an uncooked food article on said top surface of said plurality of heat conductive bar members for the purpose of cooking said food article.

6. The method of claim 5 wherein the thermally conductive liquid impervious barrier consists of aluminum foil.

* * * * *